No. 814,110. PATENTED MAR. 6, 1906.
H. C. BOSS.
DRAFT EQUALIZER.
APPLICATION FILED JULY 26, 1905.
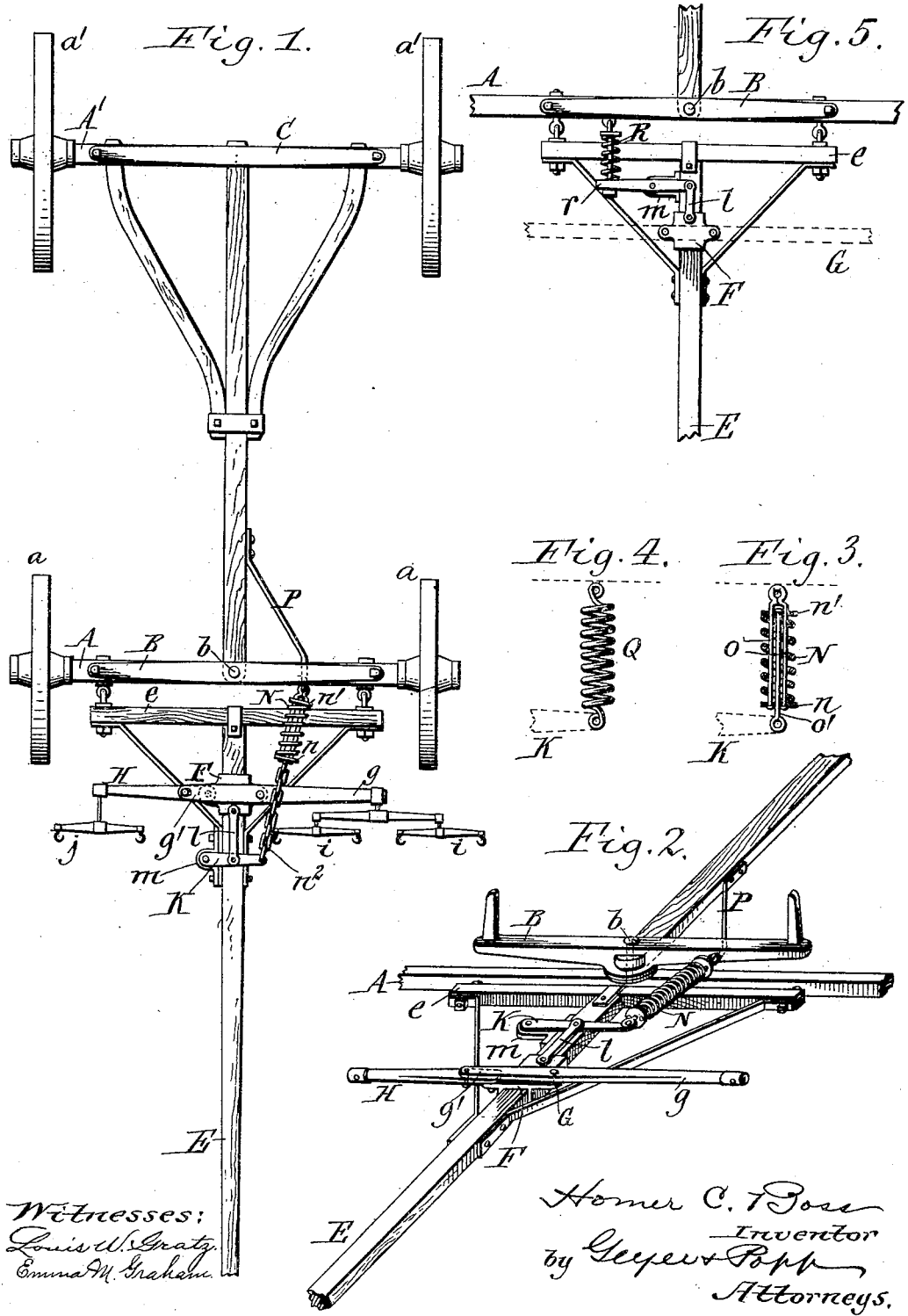

UNITED STATES PATENT OFFICE.

HOMER C. BOSS, OF LEROY, NEW YORK.

DRAFT-EQUALIZER.

No. 814,110.  Specification of Letters Patent.  Patented March 6, 1906.

Application filed July 26, 1905. Serial No. 271,273.

*To all whom it may concern:*

Be it known that I, HOMER C. BOSS, a citizen of the United States, residing at Leroy, in the county of Genesee and State of New York, have invented a new and useful Improvement in Side-Draft Equalizers, of which the following is a specification.

This invention relates to an equalizer for preventing side draft on the running-gear of an agricultural implement or vehicle when a pair of horses are arranged on one side of the pole and a single horse on the other side thereof.

It has been found in practice that when three horses are thus hitched to the running-gear of such an implement or vehicle the front end of the running-gear is constantly drawn laterally toward that side on which two horses are arranged, while the pole is pushed in the opposite direction or toward that side on which the single horse is arranged. This side draft causes the running-gear to swerve to one side of the line of draft, and therefore requires constant correction, causing the running-gear to move forward irregularly.

In planting seeds in straight rows or when harvesting the crops of the same by an animal-propelled agricultural implement such swerving or side draft is particularly objectionable, because the proper planting of the seeds and the harvesting of the crops necessitates running the implement in a straight line over the field.

No difficulty is experienced when only two horses are employed for this purpose on the opposite sides of the pole connecting with the running-gear of the agricultural implement. When, however, it becomes necessary to employ three horses on account of the nature of the soil or other conditions, two of which are placed on one side of the pole and one on the other, the objectionable swerving of the vehicle above referred to occurs.

It is the object of this invention to provide means which permit the use of three horses in the manner described for drawing the running-gear of an agricultural implement or vehicle, but prevents the swerving of the same notwithstanding the unequal pull upon the same, thereby insuring the proper planting of the seeds and also harvesting of the crops in straight parallel lines.

In the accompanying drawings, Figure 1 is a top plan view of a running-gear and pole equipped with the preferred form of my side-draft equalizer. Fig. 2 is a fragmentary perspective view of the front portion of the running-gear and the rear portion of the pole provided with a modified form of my side-draft equalizer. Fig. 3 is a top sectional view of one form of the draft-equalizing spring. Fig. 4 is a detached view of another form of the side-draft equalizing-spring. Fig. 5 is a fragmentary plan view showing another modified construction of my invention.

Similar letters of reference indicate corresponding parts throughout the several views.

The running-gear to which my invention is applicable may be of any suitable construction and may carry a seed-planting or crop-harvesting implement of various kinds. The running-gear represented in the drawings consists, essentially, of front and rear axles A A', provided at their ends with wheels $a$ $a$, a front bolster B, pivoted centrally on top of the front axle by means of a vertical king-bolt or pin $b$, a rear bolster C, secured to the rear axle, and a longitudinal reach D, connecting the front bolster with the rear bolster and rear axle.

E represents the pole or tongue, which is provided at its rear end with a cross-piece $e$, which is pivotally connected with the front axle in any suitable manner, so that the pole can swing up or down.

F represents a longitudinally-movable draft slide or carriage mounted on the rear portion of the pole. With this carriage is connected an evener for hitching up three horses, two of which travel on one side of the pole and one on the other side thereof. Various kinds of eveners may be employed for this purpose, that shown in the drawings consisting of a double-armed lever G, pivoted transversely to the slide and having its long outer arm $g$ arranged on that side of the pole on which the two horses travel and a single-armed lever H arranged on that side of the pole on which the single horse travels and pivoted at its inner end to the slide, while its intermediate part is pivotally connected with the inner arm $g'$ of the lever G. The outer arm $g$ of the double-armed lever is provided with two swingletrees $i$ $i$ for connecting with the harness of the two horses on that side of the pole, and the single-arm lever H is provided with a swingletree $j$ for connecting with the harness of the single horse traveling on the respective side of the pole.

Referring to Figs. 1 and 3, K represents a single-armed intermediate lever arranged transversely in front of the slide and having its central part connected by a link *l* with the slide and pivoted at one end to a bracket *m* on the adjacent part of the pole. The opposite end of this lever is elastically connected with the front bolster on that side of the king-bolt on which the two horses travel. The elastic connection may be variously constructed, so as to exert a constant rearward pull on the intermediate lever, that shown in Fig. 1 consisting of a compression-spring N, heads or followers *n n'*, bearing against the front and rear ends of the spring, a double rod *o*, arranged lengthwise in the spring and connected at its front end with the front follower *n* and at its rear end with a bolster, a single rod *o'*, also arranged in the spring and connected at its rear end with the rear follower *n'*, and a chain or flexible member $n^2$, connecting the front end of the single rod with the free end of the intermediate lever.

In some kinds of vehicles or implements it is necessary to prevent the front bolster from becoming displaced with reference to the reach by the pull of the spring N upon the same. A brace P is therefore provided when required, which extends from the reach to the rear side of the front bolster in line with the point of attachment of the spring N.

In the operation of this side-draft equalizing mechanism the draft which is exerted by the pull of the animals causes the slide to move forwardly on the pole, which movement is transmitted by the link *l*, intermediate lever K, and spring N to the running gear for propelling the same forwardly. While the spring is transmitting this pull from the horses to the running-gear the same also resists lateral movement of the front part of the running-gear toward the side on which the two horses are arranged, whereby the pole is prevented from swinging toward the one-horse side of the pole under the preponderating pull of the two horses. The pole is thus retained in its central position relatively to the running-gear regardless of the differential pull of the horses upon the same. As the pull of the several horses varies in proportion to the load upon the running-gear the tension upon the spring N increases or decreases, and the righting effect of the same is varied in the same measure, thereby automatically adjusting and counterbalancing the side draft upon the pole and running-gear in accordance with the forward draft on the same. By interposing a chain between the intermediate lever and the spring the latter can fold or drop out of the way, so as not to interfere with the pole and adjacent parts upon turning the same around a corner toward the two-horse side of the vehicle.

If desired, the intermediate lever K may be pivoted to a bracket *m* on the pole in rear of the evener and connected at its free end directly with the spring N without the use of a separate chain, while its central part is connected by a link *l* with the rear end of the slide F, as shown in Fig. 2.

Instead of using a spring which is compressed by the draft upon the running-gear, such as shown in Figs. 1, 2, and 3, a spring Q may be directly connected at opposite ends with the front bolster and intermediate lever, as shown in Fig. 4, which last-mentioned form of spring would be stretched by the pull of the horses upon the running-gear.

Instead of arranging the spring on the two-horse side of the pole the same effect may be produced by arranging a spring R on the opposite side of the pole and interposing the same between the front side of the front bolster and an outer arm of a double-armed intermediate lever *r*, as shown in Fig. 5. The latter has its inner arm connected by the link *l* with the slide and pivoted between its arms on the bracket *m*.

My improved draft-equalizer is especially desirable for use in connection with potato-diggers when three horses are required for harvesting the crop, inasmuch as potatoes are usually planted in straight rows, and therefore necessitate pulling the digger straight forward in order to lift all the potatoes from the earth. This equalizing mechanism is, however, applicable to vehicles of various kinds and also to other forms of agricultural implements, such as cultivators, used for crops which grow in straight rows, as such implements must move in a straight line between the rows in order to avoid damaging the crops.

I claim as my invention—

1. The combination with a running-gear having a front part, a rear part, a vertical pivot or king-bolt connecting said parts, and a pole connected with said front part, of means for equalizing side draft on the pole and running-gear comprising a spring operatively connected at one end with said rear part on one side of said pivot and at its opposite end with said pole, substantially as set forth.

2. The combination with a running-gear having a front part, a rear part, a vertical pivot or king-bolt connecting said parts, and a pole connected with said front part, of means for equalizing side draft on the pole and running-gear comprising a draft-slide mounted on said pole, and a spring operatively connected at opposite ends with said slide and with said rear part on one side of said pivot, substantially as set forth.

3. The combination with a running-gear having a front part, a rear part, a vertical pivot or king-bolt connecting said parts and a pole connected with said front part, of means for equalizing side draft on the pole and running-gear comprising a draft-slide mounted on said pole, an intermediate lever pivoted on said pole, a link connecting said lever and slide, and a spring operatively connected with said lever and with said rear part on one side of said pivot, substantially as set forth.

4. The combination with a running-gear having a front part, a rear part, a vertical pivot or king-bolt connecting said parts and a pole connected with said front part, of means for equalizing side draft on the pole and running-gear comprising a draft-slide mounted on said pole, an intermediate lever pivoted on said pole, a link connecting said lever and slide, a spring connected at one end with said rear part on one side of its pivot, and a flexible member connecting the opposite end of said spring with said intermediate lever, substantially as set forth.

5. The combination with a running-gear having a front part, a rear part, a vertical pivot or king-bolt connecting said parts and a pole connected with said front part, of means for equalizing side draft on the pole and running-gear comprising a draft-slide movable lengthwise on said pole, an evener connecting with said slide and provided on one side of the pole with two swingletrees and on the opposite side of the pole with one swingletree, an intermediate lever pivoted transversely on said pole, a longitudinal link connecting said slide with said intermediate lever, and a spring operatively connecting with said lever and with said rear part on one side of its pivotal connection with said front part and operating to yieldingly resist lateral movement of said front part and the pole toward that side of the latter on which the two swingletrees are arranged, substantially as set forth.

6. The combination with a running-gear having a front part, a rear part, a vertical pivot or king-bolt connecting said parts and a pole connected with said front part, of means for equalizing side draft on the pole and running-gear comprising a draft-slide movable lengthwise on said pole, an evener connected with said slide and provided on one side of the pole with two swingletrees and on the opposite side of the pole with one swingletree, an intermediate lever pivoted transversely on said pole, a longitudinal link connecting said slide with said intermediate lever, and means operating to yieldingly resist side draft on the front part of the running-gear and the pole comprising a spring, heads bearing against opposite ends of said spring, and rods connecting with said heads and passing through said spring one of said rods being connected with said intermediate lever and the other rod being connected with said rear part of the running-gear on that side of the king-bolt and pole on which the two swingletrees are arranged, substantially as set forth.

Witness my hand this 29th day of June, 1905.

HOMER C. BOSS.

Witnesses:
JOHN A. WILSON,
JOHN REUTHER.